United States Patent
Delany et al.

(10) Patent No.: US 8,458,723 B1
(45) Date of Patent: Jun. 4, 2013

(54) COMPUTER METHODS FOR BUSINESS PROCESS MANAGEMENT EXECUTION AND SYSTEMS THEREOF

(75) Inventors: Hubert Delany, New Rochelle, NY (US); John Johnson, Belle Harbor, NY (US)

(73) Assignee: Calm Energy Inc., Belle Harbor, NY (US)

( * ) Notice: Subject to any disclaimer, the term of this patent is extended or adjusted under 35 U.S.C. 154(b) by 197 days.

(21) Appl. No.: 12/981,145

(22) Filed: Dec. 29, 2010

Related U.S. Application Data (60) Provisional application No. 61/290,883, filed on Dec. 29, 2009.

(51) Int. Cl.
G06F 9/46 (2006.01)
(52) U.S. Cl.
CPC ................................ *G06F 9/461* (2013.01)
USPC ........................................ 718/108; 712/228
(58) Field of Classification Search
None
See application file for complete search history.

(56) References Cited

U.S. PATENT DOCUMENTS

| | | | | |
|---|---|---|---|---|
| 6,697,834 B1 * | 2/2004 | Dice | ............................... | 718/102 |
| 7,644,409 B2 * | 1/2010 | Dice et al. | ...................... | 718/104 |
| 8,185,895 B2 * | 5/2012 | Ko et al. | ........................ | 718/100 |
| 2002/0046230 A1 * | 4/2002 | Dieterich et al. | ............. | 709/107 |
| 2002/0161818 A1 * | 10/2002 | Watakabe et al. | ............. | 709/107 |
| 2004/0025160 A1 * | 2/2004 | Dice et al. | ....................... | 718/102 |
| 2006/0100986 A1 * | 5/2006 | MacPherson | ...................... | 707/2 |
| 2006/0136919 A1 * | 6/2006 | Aingaran et al. | .............. | 718/100 |
| 2007/0028240 A1 * | 2/2007 | Hayakawa | ...................... | 718/100 |
| 2009/0089471 A1 * | 4/2009 | Barros | ........................... | 710/260 |
| 2009/0210682 A1 * | 8/2009 | Gelinas et al. | ................. | 712/228 |
| 2009/0271592 A1 * | 10/2009 | Jensen | ........................... | 712/214 |
| 2009/0307696 A1 * | 12/2009 | Vals et al. | ...................... | 718/102 |
| 2010/0162014 A1 * | 6/2010 | Memon et al. | ................. | 713/320 |
| 2010/0162254 A1 * | 6/2010 | Simpson et al. | .............. | 718/102 |
| 2011/0040956 A1 * | 2/2011 | Kissell | ............................ | 712/244 |

* cited by examiner

*Primary Examiner* — Emerson Puente
*Assistant Examiner* — Mehran Kamran
(74) *Attorney, Agent, or Firm* — Greenberg Traurig, LLP (57) ABSTRACT

In one embodiment, the instant invention includes a method of executing computer instructions having steps of: a) receiving, by a first computer, an instruction to perform a task b) executing each thread of a process, corresponding to the task, to time stop point when each thread requires data from a second computer system; maintaining a data structure that identifies a state information of each thread at the time stop point, and ii) whenever each thread reaches its own stop point, each thread gives up its execution in favor of an execution of another thread; c) requesting, from the second computer system, the data needed to continue the execution of the process; d) receiving, from the second computer system, the requested data; and e) resuming the execution of the process based on the state information for each thread stored in the data structure at the time stop point.

16 Claims, 3 Drawing Sheets

COMPUTER METHODS FOR BUSINESS PROCESS MANAGEMENT EXECUTION AND SYSTEMS THEREOF

RELATED APPLICATIONS

This application claims the benefit of U.S. provisional application Ser. No. 61/290,883 filed Dec. 29, 2009, and entitled "Defined Task Orchestration," which is hereby incorporated by reference herein in its entirety for all purposes.

TECHNICAL FIELD

The present invention relates to methods and systems defining functionalities of business process management implementations such as workflow automation software.

BACKGROUND

In certain applications, functionalities of business process management implementations may include an execution engine that performs according to defined sets of rules in response to received inputs or upon occurrence of defined pre-conditions.

SUMMARY OF INVENTION

In some embodiments, the instant invention may be a method of executing computer instructions that includes steps of a) receiving, by a first computer system, a first instruction to perform a first task, i) wherein the first performance is associated with a first process, ii) wherein the first process comprising a first plurality of threads, and iii) wherein a first performance of the first task requires receiving information from a second computer system; b) receiving, by the first computer system, a second instruction to perform a second task, i) wherein the second performance is associated with a second process, and ii) wherein the second process comprising a second plurality of threads, and iii) wherein a second performance of the second task requires receiving information from a third computer system; c) executing, by the first computer system, each thread of the first plurality of threads of the first process to a first time stop point when the first plurality of threads requires data from the second computer system to continue its execution, i) wherein, during the executing each thread of the first plurality of threads, the first computer system maintains a first data structure that identifies a state information of each thread at the first time stop point, and ii) wherein, whenever each thread of the first plurality of threads requires data from the second computer system to continue its execution, each thread gives up its execution in favor of an execution of another thread from the first plurality of threads; d) executing, by the first computer system, each thread of the second plurality of threads of the second process to a second time stop point when each thread of the second plurality of threads requires data from the third computer system to continue its execution, i) wherein during the executing each thread of the second plurality of threads, the second computer system maintains a second data structure that identifies a state information of each thread at the second time stop point, and ii) wherein, whenever each thread from the second plurality of threads requires data from the third computer system to continue its execution, each thread gives up its execution in favor of an execution of another thread from the second plurality of threads; e) requesting, by the first computer system, from the second computer system, the data needed to continue the execution of each thread of the first plurality of threads of the first process; f) requesting, by the first computer system, from the third computer system, the data needed to continue the execution of each thread of the second plurality of threads of the second process; g) receiving, by the first computer system, from the second computer system, the data needed to continue the execution of each thread of the first plurality of threads of the first process; h) receiving, by the first computer system, from the third computer system, the data needed to continue the execution of each thread of the second plurality of threads of the second process; i) resuming, by the first computer system, the execution of each thread of the first plurality of threads of the first process based on the state information for each thread of the first plurality of threads which has been stored in the first data structure at the first time stop point; and j) resuming, by the first computer system, the execution of each thread of the second plurality of threads of the second process based on the state information for each thread of the second plurality of threads which has been stored in the second data structure at the second time stop point.

In some embodiments of the instant invention, the first task may represent at least one first BPM action and the second task may represent at least one second BPM action.

In some embodiments of the instant invention, the second computer system may execute a first BPM process wherein the first BPM process may include the at least one first BPM action.

In some embodiments of the instant invention, the third computer system may execute a second BPM process wherein the second BPM process may include the at least one second BPM action.

In some embodiments of the instant invention, the second and the third computer systems may be the same.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed invention.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

"Business Process Management/Modeling" ("BPM") means enterprise processes, including methods and systems, that promote and optimize business processes to achieve certain business objective (e.g., efficiency, effectiveness, flexibility, integration, etc.) For example, BPM can be a set of services and tools that provide for explicit BPM (e.g., process analysis, definition, execution, monitoring and administration), including support for human and application-level interaction. In another example, BPM supports design, execution and optimization of cross-functional business activities by both internal and external business users and technologists to incorporate people, application systems, and business partners. In yet another example, BPM can be composed of a sequence of activities (work tasks), interactions with human resources (users), or IT resources (software applications and data bases), as well as rules controlling the progression of processes through the various stages associated with its activities.

A BPM execution engine (workflow engine) is a software that is in charge of performing BPM processes.

"A business process" means a single and/or series or network of value-added activities, performed by their relevant roles or collaborators, to purposefully achieve the common business goal.

A "state" or "program state" is a particular set of instructions which will be executed in response to the machine's input and/or essentially a snapshot of the measure of various conditions in the system. The state can be thought of as analogous to a practical computer's main memory. In some embodiments, the behavior of the inventive system is a function of (a) the definition of the automaton, (b) the input and (c) the current state.

"Compatible states" are states in a state machine which do not conflict for any input values. In some embodiments, for every input, compatible states may have the same output, and the compatible states may have the same successor (or unspecified successors).

"Equivalent states" are states in a state machine which, for every possible input sequence, the same output sequence may be produced—no matter which state is the initial state.

"Distinguishable states" are states in a state machine which have at least one input sequence which may cause different output sequences—no matter which state is the initial state.

"Stable state" is a state that includes, but not limited to, as all pending processes that require processing and that have been processed as far as possible without additional input signals.

A thread of execution (or "thread") is the smallest unit of processing that can be scheduled by an operating system.

A process is an instance of a computer program that is being executed. Process may contain program code and its current activity. In some embodiments, depending on the operating system (OS), a process may be made up of multiple threads of execution that execute instructions concurrently.

In some embodiment, threads differ from processes in that:
i) processes are typically independent, while threads exist as subsets of a process;
ii) processes carry considerable state information, whereas multiple threads within a process share state as well as memory and other resources;
iii) processes have separate address spaces, whereas threads share their address space; and
iv) processes interact only through system-provided inter-process communication mechanisms.

In some embodiments, context switching between threads in the same process is typically faster than context switching between processes.

In some embodiments, BPM processes/applications can be designed for processing financial transactions. In some embodiments, BPM processes/applications can be designed for processing a credit application in which credit events (e.g., a change in credit rating, application for a credit card, or a default on a payment for example) would be monitored by a BPM server programmed by a business process diagram, and a BPM server would be used to determine how the business process would operate.

In some embodiments, BPM processes/applications can be designed for providing communication to a set of users as, for example, in a case where a set of secured mobile devices are being used by field personnel, and are managed by a centralized server. Broadcasting a message to such a set of users would require registering and scheduling a message with the centralized server. In some embodiments, mobile devices could be electronic devices such as thermostats which are capable of accepting commands or re-programming operations remotely.

In some embodiments, BPM processes/applications can be designed for any business process that uses technology to perform at least one task.

Illustrative Operating Environment

The invention may also be considered as a method of business process management including providing a network of computers and a business process control program so that a plurality of participants in a business process can interact with one another concerning the business process over the network, establishing a business process on the network made up of a plurality of tasks to be performed by the participants according to rules defined for the process, and providing a business process owner with means on the network to alter or add rules for processes that the business process owner owns.

Figure 1:
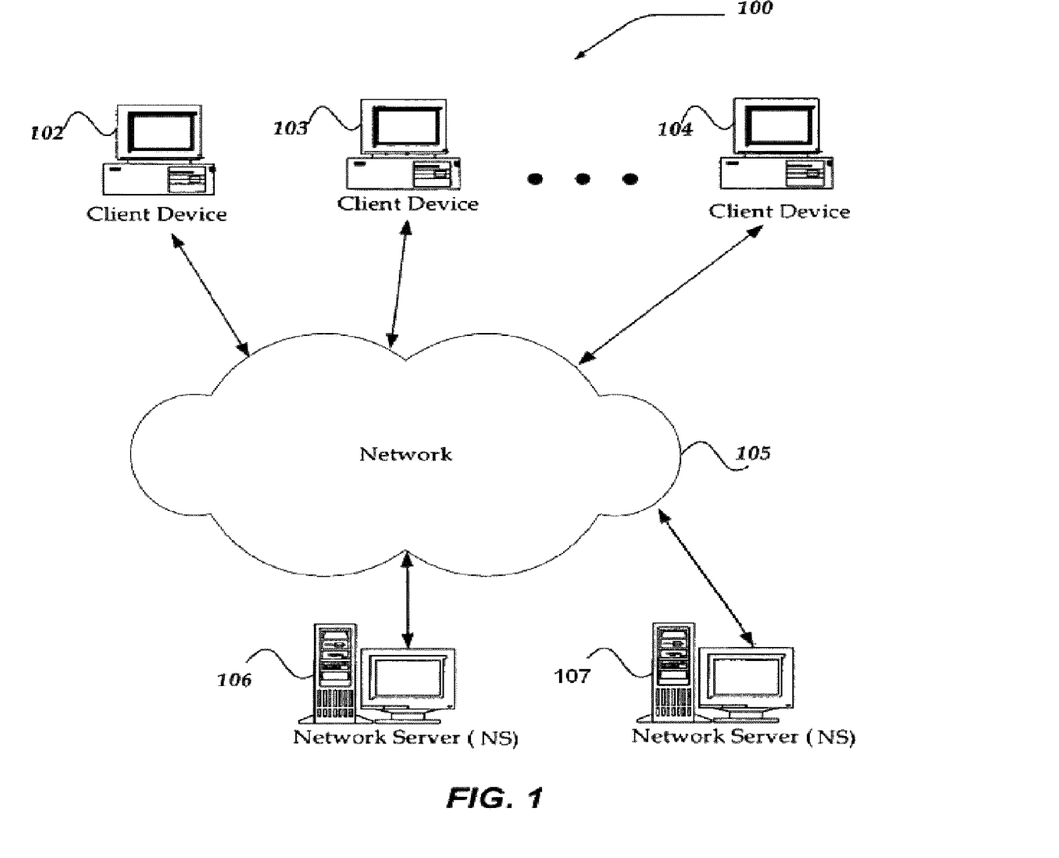
FIG. 1 shows a schematic of an embodiment of the present invention.

FIG. 1 illustrates one embodiment of an environment in which the present invention may operate. However, not all of these components may be required to practice the invention, and variations in the arrangement and type of the components may be made without departing from the spirit or scope of the invention. In some embodiment, the BMP inventive system hosts a large number of members and concurrent transactions. In other embodiments, the BMP inventive system computer is based on a scalable computer and network architecture that incorporates varies strategies for assessing the data, caching, searching, and database connection pooling.

In embodiments, members of the inventive computer system 102-104 (e.g. users of BPM diagram) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like.

Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
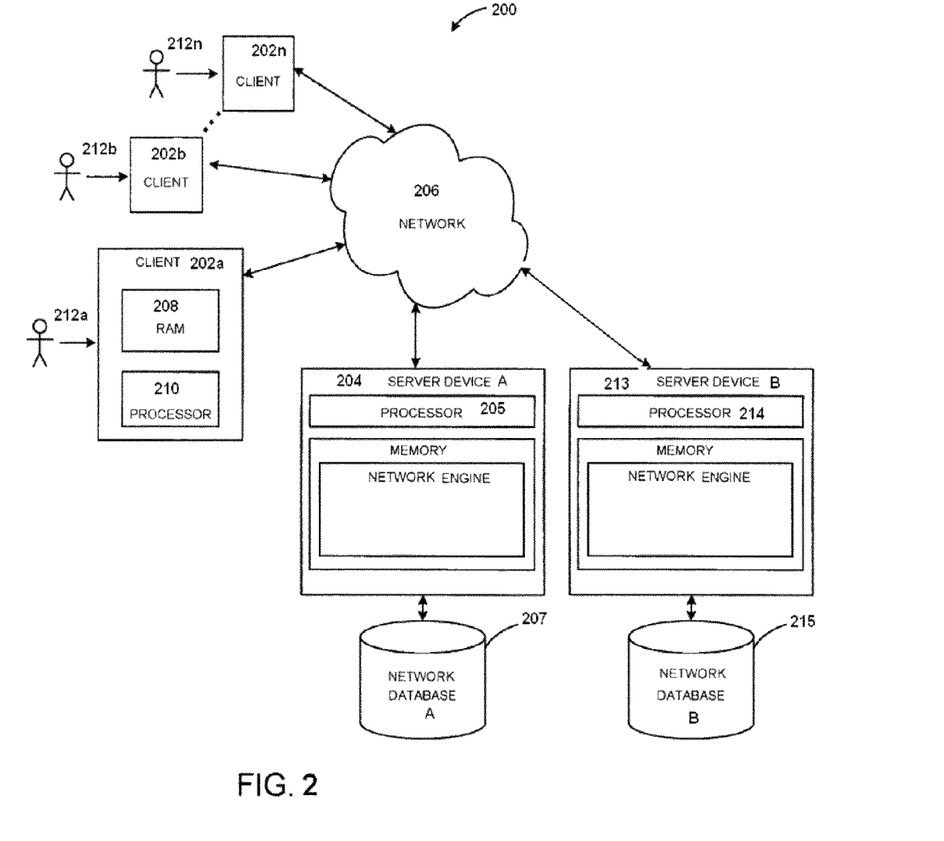
FIG. 2 shows a schematic of another embodiment of the present invention.

FIG. 2 shows another exemplary embodiment of the computer and network architecture that supports the inventive BPM system. The member devices 202a, 202b thru 202n shown (e.g. traders' desktops) each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera.

Through the client devices 202a-n, users (e.g., BMP customers and/or BPM.) 212a-n communicate over the network 206 with each other and with other systems and devices coupled to the network 206. As shown in FIG. 2, server devices 204 and 213 may be also coupled to the network 206.

In some embodiments, a simple thread mechanism can be used for a BPM execution engine.

In some embodiments, the inventive system may go from a first stable state to a second stable state.

In some embodiments of the instant invention, it is assumed that all user interfaces connected to a BPM server are of a "polled" nature (i.e., a request-response communication where the request is originated from the outside system and the BPM server sends a response). In some embodiments, in accordance with the instant invention, the inventive system is fast enough that all state transitions may occur and/or be processed between a request time and a response time.

In some embodiments of the instant invention, from a requestor's point of view, if there was processing that should have occurred between requests (i.e., at some scheduled time before the current request.) In some embodiments, the instant invention allows to, at fast enough processing speed, to achieve the state stability again before responding (i.e., within a trivial response time). In some embodiments of the instant invention, the response time varies from about 0.1 second to about 4 seconds. In some embodiments of the instant invention, the response time varies from about 0.05 second to about 5 seconds. In some embodiments of the instant invention, the response time varies from about 0.5 second to about 2 seconds. In some embodiments of the instant invention, the response time varies from about 0.001 second to about 4 seconds. In some embodiments of the instant invention, the response time varies from about 0.01 second to about 2 seconds.

In some embodiments, the present invention may be utilized for interactions between varies electronic devices (e.g., mobile PDA, computers, servers, etc.) when the present invention meets required or expected response time.

In some embodiments, the present invention is designed for PBM systems in which parts operate/communicate among each other by way of request-response dialogue (i.e., "polled" systems.) An example of a "polled" system is a system operating in accordance with pull technology or client pull (i.e., a style of network communication where the initial request for data originates from a client, and then is responded to by a server.)

Figure 3:
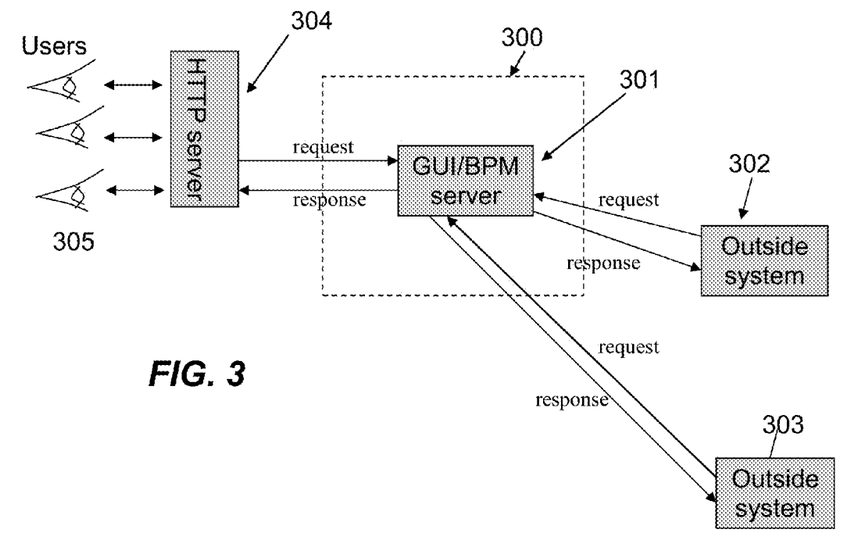
FIG. 3 shows a schematic of yet another embodiment of the present invention.

Referring to FIG. 3. In some embodiments, the instant invention can detect and/or handle any pending scheduled operations between request and response and no internal timing signals may be needed. For example, BPM users 305 of the inventive BPM system 300 perform BPM activities with HTTP server 304. The HTTP server 304 waits until it reaches a stable state (all processes that are related to the BPM users 305 interactions with the HTTP server 305 have been carried out to a point at which they cannot proceed without additional information received from the BPM server 301) and then sends a request to a BPM server 301 for the needed data which is required to continue processing interactions between the HTTP server 304 and the BPM users 305. In response to the request from the HTTP server 304, the BPM server 301 performs the requested activity and sends back the resulted output to the HTTP server 304. Similarly, the BPM server 301 communicates with other outside systems 302 and 303 through a request-respond mechanism.

In some embodiments of the instant invention, a BPM server 300 can be implemented as a subroutine to an HTTP server 304, or another responding mechanism, or as a script that runs only when a request has been received, and does not need to run as a separate process.

In some embodiments, the HTTP server 304 receives requests originating from users 305 employing web browsers via the Internet. The HTTP server 304 could then forward the requests, via a CGI interface or other application interface, to the BPM server 301, and similarly forwarding HTML formatted responses from the BPM server 301 back to the users 305 via the Internet to their browsers.

In some embodiments, an example of the application interface could be an AJAX application (i.e., asynchronous JavaScript and XML which is a group of interrelated web development methods used on the client-side to create interactive web applications) running a script within a user's browser that would send SOAP-formatted (Simple Object Access Protocol) xml-based requests via a network directly to a BPM server 301, which would respond in xml format.

In some embodiments of the instant invention, by avoiding inter-process communications (i.e., an exchange of data among multiple threads in one or more processes) between the HTTP server 304 and the BPM server 300, the BPM server 300 can be implemented in a more efficient manner (e.g., higher processing speed, less coding.)

In some embodiments, since processing only occurs between requests and responses, a load on the computer implementing the BPM server 300 may vary directly with a rate of access (i.e., a number of requests made per second) and a state of the processing is saved during periods of no access.

In some embodiments, the instant invention allows for a more efficient "cloud"-based systems (i.e., Internet-based computing systems, whereby shared servers provide resources, software, and data to computers and other devices on demand) because more processing becomes available for use by other customers in the "cloud".

For example, in some embodiments, the instant invention may allows to deploy BPM in cases where BPM users and providers have web site hosting services from separate organizations. In such cases, typically, a BPM user has a control of what content is being served by a BPM server assigned to the BPM user for his or her web site, but the BPM user des not have control over processes on the BPM server (i.e., the BPM user is not allowed, for security and management reasons, to start and stop applications and servers on the system provided.) The BPM's user's control can be limited to ability to specify what content the BPM web server would include (i.e., what content would be provided in response to requests from the BPM users accessing the web site in question.)

In some embodiments, content that the BPM use may include, but not limited to) executable content (i.e., scripts, that execute on the BPM server computer when a request is received, but are not allowed to continue to execute after the response has been sent.) In some embodiments, the instant invention may allow the BPM user to employ a BPM in his or her web site because all processing occurs between request and response.

In some embodiments, the instant invention allows to avoid running a background job (i.e., daemon) which is an independent process run separately from a BPM server; or to avoid running the BPM server itself as a background process. In some embodiments, the instant invention allows to avoid having a separate user interface server (e.g., an HTTP server or other front end server) and implementing inter-process communications between the user's interface (GUI) and the BPM server. In some embodiments, the instant invention allows to avoid having a separate HTTP server to be a part of the BPM server itself.

Therefore, the instant invention can detect and handle any pending scheduled operations between request and response and no separate batch processing is needed. The engine works by a 'give up' style of thread context switching, wherein the current thread can at any time give up its processing in favor of another (waiting thread). Multiple thread in a process instance (i.e. BPM 'instance' share a variable space, (called a frame) and so the only separate state information each thread needs to have is a call stack (each entry of which says what step to return to) and something indicating which thread (instance) it is part of.

In some embodiments, the instant invention may be a method of executing computer instructions that includes steps of a) receiving, by a first computer system, a first instruction to perform a first task, i) wherein the first performance is associated with a first process, ii) wherein the first process comprising a first plurality of threads, and iii) wherein a first performance of the first task requires receiving information from a second computer system; b) receiving, by the first computer system, a second instruction to perform a second task, i) wherein the second performance is associated with a second process, and ii) wherein the second process comprising a second plurality of threads, and iii) wherein a second performance of the second task requires receiving information from a third computer system; c) executing, by the first computer system, each thread of the first plurality of threads of the first process to a first time stop point when the first plurality of threads requires data from the second computer system to continue its execution, i) wherein, during the executing each thread of the first plurality of threads, the first computer system maintains a first data structure that identifies a state information of each thread at the time of the first time stop point, and ii) wherein, whenever each thread of the first plurality of threads requires data from the second computer system to continue its execution, each thread gives up its execution in favor of an execution of another thread from the first plurality of threads; d) executing, by the first computer system, each thread of the second plurality of threads of the second process to a second time stop point when each thread of the second plurality of threads requires data from the third computer system to continue its execution, i) wherein during the executing each thread of the second plurality of threads, the second computer system maintains a second data structure that identifies a state information of each thread at the time of the second time stop point, and ii) wherein, whenever each thread from the second plurality of threads requires data from the third computer system to continue its execution, each thread gives up its execution in favor of an execution of another thread from the second plurality of threads; e) requesting, by the first computer system, from the second computer system, the data needed to continue the execution of each thread of the first plurality of threads of the first process; f) requesting, by the first computer system, from the third computer system, the data needed to continue the execution of each thread of the second plurality of threads of the second process; g) receiving, by the first computer system, from the second computer system, the data needed to continue the execution of each thread of the first plurality of threads of the first process; h) receiving, by the first computer system, from the third computer system, the data needed to continue the execution of each thread of the second plurality of threads of the second process; i) resuming, by the first computer system, the execution of each thread of the first plurality of threads of the first process based on the state information for each thread of the first plurality of threads which has been stored in the first data structure at the first time stop point; and j) resuming, by the first computer system, the execution of each thread of the second plurality of threads of the second process based on the state information for each thread of the second plurality of threads which has been stored in the second data structure at the second time stop point.

In some embodiments of the instant invention, the first task may represent at least one first BPM action and the second task may represent at least one second BPM action.

In some embodiments of the instant invention, the second computer system may execute a first BPM process wherein the first BPM process may include the at least one first BPM action.

In some embodiments of the instant invention, the third computer system may execute a second BPM process wherein the second BPM process may include the at least one second BPM action.

In some embodiments of the instant invention, the second and the third computer systems may be the same.

In some embodiments, the instant invention may include a programmed computer for executing computer instructions that may include a) a memory having at least one region for storing computer executable program code; and b) a processor for executing the program code stored in the memory, wherein the program code includes: i) code to receive a first instruction to perform a first task, i) wherein the first performance is associated with a first process, ii) wherein the first process comprising a first plurality of threads, and iii) wherein a first performance of the first task requires receiving information from a second computer system; b) code to receive a second instruction to perform a second task, i) wherein the second performance is associated with a second process, and ii) wherein the second process comprising a second plurality of threads, and iii) wherein a second performance of the second task requires receiving information from a third computer system; c) code to execute each thread of the first plurality of threads of the first process to a first time stop point when the first plurality of threads requires data from the second computer system to continue its execution, i) wherein, during the executing each thread of the first plurality of threads, the first computer system maintains a first data structure that identifies a state information of each thread at the first time stop point, and ii) wherein, whenever each thread of the first plurality of threads requires data from the second computer system to continue its execution, each thread gives up its execution in favor of an execution of another thread from the first plurality of threads; d) code to execute each thread of the second plurality of threads of the second process to a second time stop point when each thread of the second plurality of threads requires data from the third computer system to continue its execution, i) wherein during the executing each thread of the second plurality of threads, the second computer system maintains a second data structure that identifies a state information of each thread at the second time stop point, and ii) wherein, whenever each thread from the second plurality of threads requires data from the third computer system to continue its execution, each thread gives up its execution in favor of an execution of another thread from the second plurality of threads; e) code to request, from the second computer system, the data needed to continue the execution of each thread of the first plurality of threads of the first process; f) code to request, from the third computer system, the data needed to continue the execution of each thread of the second plurality of threads of the second process; g) code to receive, from the second computer system, the data needed to continue the execution of each thread of the first plurality of threads of the first process; h) code to receive, from the third computer system, the data needed to continue the execution of each thread of the second plurality of threads of the second process; i) code to resume the execution of each thread of the first plurality of threads of the first process based on the state information for each thread of the first plurality of threads which has been stored in the first data structure at the first time stop point; and j) code to resume the execution of each thread of the second plurality of threads of the second process based on the state information for each thread of the second plurality of threads which has been stored in the second data structure at the second time stop point.

In some embodiments, the instant invention may include a computer readable medium encoded with compute readable program code for executing computer instructions, the program code may include subroutines for: a) receiving, by a first computer system, a first instruction to perform a first task, i) wherein the first performance is associated with a first process, ii) wherein the first process comprising a first plurality of threads, and iii) wherein a first performance of the first task requires receiving information from a second computer system; b) receiving, by the first computer system, a second instruction to perform a second task, i) wherein the second performance is associated with a second process, and ii) wherein the second process comprising a second plurality of threads, and iii) wherein a second performance of the second task requires receiving information from a third computer system; c) executing, by the first computer system, each thread of the first plurality of threads of the first process to a first time stop point when the first plurality of threads requires data from the second computer system to continue its execution, i) wherein, during the executing each thread of the first plurality of threads, the first computer system maintains a first data structure that identifies a state information of each thread at the first time stop point, and ii) wherein, whenever each thread of the first plurality of threads requires data from the second computer system to continue its execution, each thread gives up its execution in favor of an execution of another thread from the first plurality of threads; d) executing, by the first computer system, each thread of the second plurality of threads of the second process to a second time stop point when each thread of the second plurality of threads requires data from the third computer system to continue its execution, i) wherein during the executing each thread of the second plurality of threads, the second computer system maintains a second data structure that identifies a state information of each thread at the second time stop point, and ii) wherein, whenever each thread from the second plurality of threads requires data from the third computer system to continue its execution, each thread gives up its execution in favor of an execution of another thread from the second plurality of threads; e) requesting, by the first computer system, from the second computer system, the data needed to continue the execution of each thread of the first plurality of threads of the first process; f) requesting, by the first computer system, from the third computer system, the data needed to continue the execution of each thread of the second plurality of threads of the second process; g) receiving, by the first computer system, from the second computer system, the data needed to continue the execution of each thread of the first plurality of threads of the first process; h) receiving, by the first computer system, from the third computer system, the data needed to continue the execution of each thread of the second plurality of threads of the second process; i) resuming, by the first computer system, the execution of each thread of the first plurality of threads of the first process based on the state information for each thread of the first plurality of threads which has been stored in the first data structure at the first time stop point; and j) resuming, by the first computer system, the execution of each thread of the second plurality of threads of the second process based on the state information for each thread of the second plurality of threads which has been stored in the second data structure at the second time stop point.

As detailed above, in some embodiments, threads within a process can be executed sequentially, until each thread reaches its own state when, to continue its execution, the thread needs data from an outside source. In some other embodiments, threads of a process are executed in parallel. For example, such embodiments may involve a situation where either (1) an interface existed to another system that represents a large body of smaller systems (for example, an interface to an application that collects data from many sensors such as GPS devices on trucks, or health sensors on cows etc) where, at periodic intervals, large numbers of individual data updates become available pertaining to large numbers of separate entities each of which is involved in a process instance; or (2) where data updates from multiple entities each of which are involved with a process come in serially but come in so fast that it becomes advantageous or necessary because of network delays to buffer the data in a fifo, lifo, or other type of buffer and many are available to be processed at once. In some other embodiments, this situation (i.e. where the number of separable updates available is comparable or much greater than the number of processors available) threads from the plurality would be distributed among different processors and processed in parallel. In some embodiments, the threads could be re-aggregated into a single queue (plurality) again after reaching stable state. In some other embodiments, the re-aggregation may not be necessary i.e. where either (a) a fixed and efficient mapping may be made between dependent threads and processors such that all threads may be co-located on the same processors as those others on which they are interdependent, or (b) where a communication mechanism exists between processors such threads may be moved between processors at a throughput rate comparable to the rate of processing of the threads from stable state to stable state or where threads can be stored on a shared memory mechanism such that any thread may be accessed from any processor without adding appreciable delay.

Examples of Applications of Some Embodiments

In some embodiments, a thread can be stored by way of a stack (where "the stack" resides in a database, or in cache (i.e. temporary object). In some embodiments, the thread is executed by running a return on it.

In some applications, the instant invention may process three sets of threads:

(1) threads that are "Running" which means that these threads may not need to be stored in any order, and they can be handled via a LIFO queue (i.e. may be handled via a linked list). In some embodiments, the linked list must be empty upon stability.

stroed as $this->running_threads[ ]=stack 2) threads that are "Sleeping" until a specific time. These threads may be held in ascending sorted order, according to the time they want to continue, such that the next one to process will be in the front of the list. These "sleeping" thrads can, in some embodiments be stored via a btree of linked lists.

stored as $this->sleeping_threads[deadline][ ]=stack 3) threads that are "waiting" for some input signal. These threads are held in an associative array, indexed by the id of the signal they are waiting for.

stored as an associative array of linked lists as in:
$this->waiting_threads[signal_id][ ]=stack.

In some embodiments, BPM diagrams are programmed in fast programming languages (e.g., C language and assembler.)

In some embodiments, the invention allows a user of BPM to interpret (work with) BPM diagrams directly, so to avoid compilation.

```
class thread_fsm {
  var $running_threads=array( ); // array of running threads (stacks), [ ]=>stack
  var $sleeping_threads=array( ); // array of sleeping threads (sets of stacks), by deadline. [deadline] [ ]=stack
  var $waiting_threads=array( ); // array of waiting threads (stacks), by signal [signalid] [ ]=>stack
  var $stack=array( ); // the current stack
  var $step=null; // identifier of the current step
  var $next_deadline; // time of the next sleep deadline i.e. min time we need to be checking again.
  var $deadline; // place to store argument to giveup_until
  var $signal; // place to store argument to giveup_until_signal or trigger
  // call a routine. return step is where to return from
  function thread_call($newstep, $returnstep) {
    array_unshift($this->stack,$returnstep); // push the return step onto the stack
    $this->step=$newstep; // and goto the new step
  }
  // return from a routine. return step is where to return from
  function thread_return( ){
    // if stack is full, . . .
    if (count($this->stack)) {
      $this->step=array_shift($this->stack); // set the step
    }
    // if none, go to find more
    else $this->step='findmore';
  }
```

```
function run_until_stable( ){
while ($this->step !='stable') {
$this->single_step( );
}}
function single_step( ){
switch($this->step) {
// if you jump to this at the end of a subroutine (with
$deadline arg set) it will
// put the current thread into the sleeping queue (i.e. the
stack) to be run later
// then context switch to another thread
case 'giveup_until_time':
// put the current stack onto the queue
$this->sleeping_threads[$this->deadline][ ]=
$this->stack;
// re-sort the set, so that the lowest ones will be first again
ksort($this->sleeping_threads); // and go to find more
$this->step='findmore';
break;
// trigger one signal. this will run one of the threads waiting
for the signal if there are any the current thread will
// continue immediately
case 'single_trigger':
// see if there are any threads waiting for this signal
if (count($this->waiting_threads[$this->signal]))
{
// if so, pull one and put this thread on the running queue
$this->running_threads[ ]=array_shift($this->waiting_th-
reads[$this->signal]);
}
// and continue
$this->thread_return( );
break;
// trigger multi signal. all threads waiting for the indicated
signal will be run. the current thread will continue
// immediately
case 'multi_trigger':
// see if there are any threads waiting for this signal
if (count($this->waiting_threads[$this->signal]))
// if so, pull them all and put them on the running stack
foreach(
array_shift($this->waiting_threads) as $stk) $this->run-
ning_threads[ ]=$stk;
// and continue
$this->thread_return( );
break;
// if you jump to this at the end of a subroutine (with
$deadline arg set) it will put the current thread into the waiting
queue (i.e. the stack) to run when a signal is received
//
case 'giveup_until_signal':
// put the current stack onto the waiting queue
$this->waiting_threads[$this->signal][ ]=
$this->stack;
// and go to find more $this->step='findmore';
break;
//same as giveup until time, except the deadline arg is a
delay time, not a deadline
case 'giveup_for_time':
$this->deadline+=time( );
$this->step='giveup_until_time';
break;
//if there is no step, or requesting to just give up processing
to another thread, we do this
default:
case null:
case 'findmore':
// see if there are any running threads. if so, do it
if (count($this->running_threads)) {
$this->stack=
array_shift($this->running_threads);
$this->thread_return( );
break;
}
// now see if there are any sleeping threads that need to be
done.
if (count($this->sleeping_threads)) {
foreach($this->sleeping_threads as $dead line=>$set) {
// if the first deadline is later, store the next deadline
if ($deadline>time( )) {
$this->next_deadline=$deadline;
$this->step='stable';
break;
}
// it isnt, so convert the current set to running
else {
foreach($set as $stk)
$this->running_threads[ ]=$stk;
// and continue. this will branch to 'goto_another' again.
break;
}}}
else $this->step='stable'; // if nothing was found, we are
stable
break;
}}}
```

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further still, the various steps may be carried out in any desired order (and any desired steps may be added and/or any desired steps may be eliminated).

What is claimed is:

1. A method of executing computer instructions, comprising:
   a) receiving, by a first computer system, a first instruction to perform a first task, wherein the performance of the first task is a first performance,
      i) wherein the first performance is associated with a first process,
      ii) wherein the first process comprising a first plurality of threads, and
      iii) wherein the first performance of the first task requires receiving information from a second computer system;
   b) receiving, by the first computer system, a second instruction to perform a second task, wherein the performance of the second task is a second performance,
      i) wherein the second performance is associated with a second process, and
      ii) wherein the second process comprising a second plurality of threads, and iii) wherein the second performance of the second task requires receiving information from a third computer system;
c) executing, by the first computer system, each thread of the first plurality of threads of the first process to a first time stop point when the first plurality of threads requires data from the second computer system to continue its execution,
i) wherein, during the execution, the first computer system maintains a first data structure that is configured to store each thread of the first plurality of threads of the first process in accordance with at least the following rules:
 1) a first subset of threads of first plurality threads, which are being executed, is stored in a last-in, first-out queue,
 2) a second subset of threads of first plurality threads, which are not executed until each pre-determine time associated with each thread in the second subset is reached, is stored in an ascending order of the pre-determine times so as to next thread to be process is a first in the ascending order, and
 3) a third subset of threads of first plurality threads, which are awaiting for data to continue the execution, is stored in an associative array based on an index of respective identifiers associated with data for each respective thread of the third subset of threads of first plurality threads, and
ii) wherein, whenever each thread of the first plurality of threads requires data from the second computer system to continue its execution, each thread gives up its execution in favor of an execution of another thread from the first plurality of threads;
d) executing, by the first computer system, each thread of the second plurality of threads of the second process to a second time stop point when each thread of the second plurality of threads requires data from the third computer system to continue its execution,
i) wherein during the execution, the second computer system maintains a second data structure that is configured to store each thread of the second plurality of threads of the second process in accordance with at least the following rules:
 1) a fourth subset of threads of second plurality threads, which are being executed, is stored in a last-in, first-out queue,
 2) a fifth subset of threads of second plurality threads, which are not executed until each pre-determine time associated with each thread in the fifth subset is reached, is stored in an ascending order of the pre-determine times so as to next thread to be process is a first in the ascending order, and
 3) a sixth subset of threads of second plurality threads, which are awaiting for data to continue the execution, is stored in a second associative array based on an index of respective identifiers associated with data for each respective thread of the sixth subset of threads of second plurality threads, and
ii) wherein, whenever each thread from the second plurality of threads requires data from the third computer system to continue its execution, each thread gives up its execution in favor of an execution of another thread from the second plurality of threads;
e) requesting, by the first computer system, from the second computer system, the data needed to continue the execution of each thread of the first plurality of threads of the first process;
f) requesting, by the first computer system, from the third computer system, the data needed to continue the execution of each thread of the second plurality of threads of the second process;
g) receiving, by the first computer system, from the second computer system, the data needed to continue the execution of each thread of the first plurality of threads of the first process;
h) receiving, by the first computer system, from the third computer system, the data needed to continue the execution of each thread of the second plurality of threads of the second process;
i) resuming, by the first computer system, the execution of each thread of the first plurality of threads of the first process based on the state information for each thread of the first plurality of threads which has been stored in the first data structure at the first time stop point; and
j) resuming, by the first computer system, the execution of each thread of the second plurality of threads of the second process based on the state information for each thread of the second plurality of threads which has been stored in the second data structure at the second time stop point.

2. The method of executing computer instructions of claim 1, wherein the first task represents at least one first enterprise action and the second task represents at least one second enterprise action.

3. The method of executing computer instructions of claim 2, wherein the second computer system executes a first enterprise process wherein the first enterprise process comprises the at least one first enterprise action.

4. The method of executing computer instructions of claim 2, wherein the third computer system executes a second enterprise process wherein the second enterprise process comprises the at least one second enterprise action.

5. The method of executing computer instructions of claim 1, wherein the second and the third computer systems are the same.

6. The method of executing computer instructions of claim 5, wherein the first task represents at least one first enterprise action and the second task represents at least one second enterprise action.

7. The method of executing computer instructions of claim 6, wherein the second computer system executes a first enterprise process wherein the first enterprise process comprises the at least one first enterprise action.

8. The method of executing computer instructions of claim 6, wherein the third computer system executes a second enterprise process wherein the second enterprise process comprises the at least one second enterprise action.

9. A specially programmed computer system, comprising:
at least one first specially programmed computer that comprises:
a non-transient computer memory having at least one region for storing computer executable program code; and
at least one processor for executing the program code, wherein the program code comprises:
 a) code to receive a first instruction to perform a first task, wherein the performance of the first task is a first performance,
  i) wherein the first performance is associated with a first process,
  ii) wherein the first process comprising a first plurality of threads, and iii) wherein the first performance of the first task requires receiving information from a second computer system;
b) code to receive a second instruction to perform a second task, wherein the performance of the second task is a second performance,
  i) wherein the second performance is associated with a second process, and
  ii) wherein the second process comprising a second plurality of threads, and
  iii) wherein the second performance of the second task requires receiving information from a third computer system;
c) code to execute each thread of the first plurality of threads of the first process to a first time stop point when the first plurality of threads requires data from the second computer system to continue its execution,
i) wherein, during the execution, the at least one first specially programmed computer maintains a first data structure that is configured to store each thread of the first plurality of threads of the first process in accordance with at least the following rules:
  1) a first subset of threads of first plurality threads, which are being executed, is stored in a last-in, first-out queue,
  2) a second subset of threads of first plurality threads, which are not executed until each pre-determine time associated with each thread in the second subset is reached, is stored in an ascending order of the pre-determine times so as to next thread to be process is a first in the ascending order, and
  3) a third subset of threads of first plurality threads, which are awaiting for data to continue the execution, is stored in an associative array based on an index of respective identifiers associated with data for each respective thread of the third subset of threads of first plurality threads, and
ii) wherein, whenever each thread of the first plurality of threads requires data from the second computer system to continue its execution, each thread gives up its execution in favor of an execution of another thread from the first plurality of threads;
d) code to execute each thread of the second plurality of threads of the second process to a second time stop point when each thread of the second plurality of threads requires data from the third computer system to continue its execution,
i) wherein during the execution, the at least one first specially programmed computer maintains a second data structure that is configured to store each thread of the second plurality of threads of the second process in accordance with at least the following rules:
  1) a fourth subset of threads of second plurality threads, which are being executed, is stored in a last-in, first-out queue,
  2) a fifth subset of threads of second plurality threads, which are not executed until each pre-determine time associated with each thread in the fifth subset is reached, is stored in an ascending order of the pre-determine times so as to next thread to be process is a first in the ascending order, and
  3) a sixth subset of threads of second plurality threads, which are awaiting for data to continue the execution, is stored in a second associative array based on an index of respective identifiers associated with data for each respective thread of the sixth subset of threads of second plurality threads, and
ii) wherein, whenever each thread from the second plurality of threads requires data from the third computer system to continue its execution, each thread gives up its execution in favor of an execution of another thread from the second plurality of threads;
e) code to request, from the second computer system, the data needed to continue the execution of each thread of the first plurality of threads of the first process;
f) code to request, from the third computer system, the data needed to continue the execution of each thread of the second plurality of threads of the second process;
g) code to receive, from the second computer system, the data needed to continue the execution of each thread of the first plurality of threads of the first process;
h) code to receive, from the third computer system, the data needed to continue the execution of each thread of the second plurality of threads of the second process;
i) code to resume the execution of each thread of the first plurality of threads of the first process based on the state information for each thread of the first plurality of threads which has been stored in the first data structure at the first time stop point; and
j) code to resume the execution of each thread of the second plurality of threads of the second process based on the state information for each thread of the second plurality of threads which has been stored in the second data structure at the second time stop point.

10. The specially programmed computer system of claim 9, wherein the first task represents at least one first enterprise action and the second task represents at least one second enterprise action.

11. The specially programmed computer system of claim 10, wherein the second computer system executes a first enterprise process wherein the first enterprise process comprises the at least one first enterprise action.

12. The specially programmed computer system of claim 10, wherein the third computer system executes a second enterprise process wherein the second enterprise process comprises the at least one second enterprise action.

13. The specially programmed computer system of claim 9, wherein the second and the third computer systems are the same.

14. The specially programmed computer system of claim 13, wherein the first task represents at least one first enterprise action and the second task represents at least one second enterprise action.

15. The specially programmed computer system of claim 14, wherein the second computer system executes a first enterprise process wherein the first enterprise process comprises the at least one first enterprise action.

16. The specially programmed computer system of claim 14, wherein the third computer system executes a second enterprise process wherein the second enterprise process comprises the at least one second enterprise action.

* * * * *